United States Patent [19]

Morioka et al.

[11] Patent Number: 5,367,626
[45] Date of Patent: Nov. 22, 1994

[54] AUTOMATIC ICON GENERATION SYSTEM

[75] Inventors: Makoto Morioka; Masato Ikemori, both of Kawasaki; Kazuo Hattori, Yokohama; Hiroshi Suzuki, Kawasaki, all of Japan

[73] Assignee: Fujitsu Limited, Kawasaki, Japan

[21] Appl. No.: 181,874

[22] Filed: Jan. 13, 1994

Related U.S. Application Data

[63] Continuation of Ser. No. 610,586, Nov. 8, 1990, abandoned.

[30] Foreign Application Priority Data

Nov. 8, 1989 [JP] Japan .................... 1-288758

[51] Int. Cl.$^5$ .............................. C06F 15/62
[52] U.S. Cl. ...................... 395/159; 395/156
[58] Field of Search ............... 395/155–161, 395/154, 135; 340/700; 345/133, 145–146, 115

[56] References Cited

U.S. PATENT DOCUMENTS

| | | | |
|---|---|---|---|
| 4,757,470 | 7/1988 | Bruce et al. | 395/135 |
| 4,813,013 | 3/1989 | Dunn | 395/159 |
| 4,882,687 | 11/1989 | Gordon | 395/135 |
| 4,901,221 | 2/1990 | Kodosky et al. | 395/159 |
| 4,914,607 | 4/1990 | Takamashi et al. | 340/721 X |
| 4,984,152 | 1/1991 | Muller | 395/159 X |
| 5,041,992 | 8/1991 | Cunningham et al. | 395/135 |

OTHER PUBLICATIONS

Tsuda et al, "Iconic Browser", IEEE Workshop on Visual Languages, 1989, pp. 130–136.
Edel, "The Tinkertoy Graphical Programming Environment", IEEE Trans. on Software Eng., Aug. 1988, pp. 1110–1115.
Chang, et al, "A Visual Language Compiler", May 1989, pp. 506–524, IEEE Transactions on Software Engineering, vol. 15, No. 5 S. Chang, "Visual Languages: A Tutorial and Survey", Jan. 1987, pp. 29–39, IEEE Software, vol. 4, No. 1.
Clarisse, et al., "An Icon Manager in Lisp", Jun. 1985, pp. 116–121, 1985 IEEE Workshop on Languages for Automation.

*Primary Examiner*—Heather R. Herndon
*Assistant Examiner*—John E. Breene
*Attorney, Agent, or Firm*—Staas & Halsey

[57] ABSTRACT

To improve user-friendliness, icons selectable by a user are automatically generated by synthesizing more basic graphics. The system for displaying icons according to utilization frequency and to comprehensively express the computer's various modes. An icon pattern memory stores a plurality of graphic elements representing icon patterns which can be combined to generate the icons used in the computer. An icon pattern synthesizer synthesizing icon patterns in the icon pattern memory to generate the icons. An icon utilization controller controls the icon synthesis by the icon pattern synthesizer according to the user's input and monitors the utilization of all icons that can be synthesized by the icon synthesizer. A display controller controls display of a plurality of icons on the display screen of the computer according to the icon utilization, under the control of the icon utilization controller.

10 Claims, 24 Drawing Sheets

FIG. 3

| NOUN ICON PATTERN \ VERB ICON PATTERN | DELETION | COPYING | PASTING-IN | ERASE | ROTATION | MAGNIFICATION / COMPRESSION | CREATION | REVISION |
|---|---|---|---|---|---|---|---|---|
| ○ FILE | ▫ | ▫ | ▫ | ▫ | ◯ | ▫ | ▫ | ▫ |
| TEXT ☰ | ☰ | ☰ | ☰ | ☰ | ☰ | ☰ | ☰ | ☰ |
| WORD ▬▬ | ▬▬ | ▬▬ | ▬▬ | ▬▬ | ▬▬ | ▬▬ | | |
| CHARACTER ▪ | ▪ | ▪ | ▪ | ▪ | ▪ | ▪ | | |
| ○ DRAWING GRAPHIC △ | △ | △ | △ | △ | △ | △ | △ | △ |
| LINE ╱ | ╱ | ╱ | ╱ | ╱ | ╱ | | ╱ | ╱ |
| DOT • | • | • | • | ○ | | | | |

FIG. 13A

| B\A | TEXT | GRAPHIC | IMAGE | GRAPH |
|---|---|---|---|---|
| SHEET | | | | |

OR SYNTHESIS (A ∪ B)

FIG. 13B

| B\A | TEXT | WORD | GRAPHIC | LINE |
|---|---|---|---|---|
| NETWORK PATTERN | | | | |

AND SYNTHESIS (A ∩ B)

NAND SYNTHESIS $(\overline{A \cap B})$

AND SYNTHESIS

FIG. 14A

| A \ B | CIRCLE | CAPSULE | ELLIPSE | SECTOR | TRIANGLE |
|---|---|---|---|---|---|
| OUTLINE PATTERN | ○ | ◯ | ⬭ | △ | △ |

FIG. 14B

| A \ B | PARALLEL LINE | EXTENSION | DIMENSION LINE | ANGLE LINE | TANGENT LINE |
|---|---|---|---|---|---|
| OUTLINE PATTERN | ∥↗ | ↗ | ✕ | ∠θ | ⊙↗ |

FIG. 14C

| A \ B | REGISTER | READ OUT | ERASE |
|---|---|---|---|
| DICTIONARY | ⬇ | ⬆ | 📄 |

FIG. 14D
| A \ B | HATCHING PATTERN | ORNAMENT | FLOW CHART | ELECTRIC CIRCUIT |
|---|---|---|---|---|
| COMPONENT BOOK PATTERN |  | 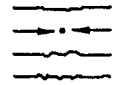 | 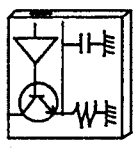 | 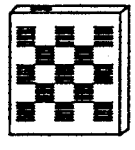 |
FIG. 14E
| A \ B | 1 | 2 | 3 | ... | 10 |
|---|---|---|---|---|---|
| | — | = | ≡ | | — |
| PRINTER | 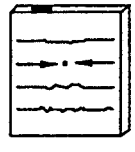 | 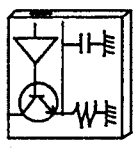 | 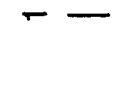 | |  |

FIG. 14F

| EDIT PATTERN / OUTLINE PATTERN | CENTERING | RIGHT JUSTIFICATION | LEFT JUSTIFICATION | PROPORTIONAL SPACING |
|---|---|---|---|---|
| | →☐← | →☐ | ☐← | ☐↔☐↔☐ |
| ☐ | →☐← | →☐ | ☐← | ☐↔☐↔☐ |

FIG. 14G

| OBJECT PATTERN / SEARCHING PATTERN | FILE | FOLDER | CHARACTER STRING |
|---|---|---|---|
| | 📄 | 📁 | x x x x x |
| | | | |

FIG. 14H

| INSTRUCTION PATTERN / PAGE PATTERN | PREVIOUS PAGE | NEXT PAGE | DESIGNATING PAGE |
|---|---|---|---|
| | ◁ | ▷ | ? P |
| 📖 | | | ? P |

FIG. 16A

| CONTROL FORMAT PATERN | MEDIUM ATTRIBUTE DISPLAY PATTERN | | SERVICE ATTRIBUTE DISPLAY PATTERN | |
|---|---|---|---|---|
| DATA SHEET | TEXT | DRAWING | TEXT | DRAWING |
| SLIP | PICTURE | GRAPH(CHART) | PICTURE | GRAPH(CHART) |
| BINDER | FORM | TABLE | FORM | TABLE |
| SCREEN FORM | LIST | SCHEDULE | LIST | SCHEDULE |
| PRINT FORM | PROJECT PLAN | CANT CHART | PROJECT PLAN | CANT CHART |
| | LOGIC DIAGRAM | STATISTICAL ANALYSIS | LOGIC DIAGRAM | STATISTICAL ANALYSIS |

FIG. 16B

| CONTROL FORMAT PATTERN (CONT) | MEDIUM ATTRIBUTE DISPLAY PATTERN (CONT) | | SERVICE ATTRIBUTE DISPLAY PATTERN (CONT) | |
|---|---|---|---|---|
| |  MUSIC |  ADDRESS |  MUSIC | ADDRESS |
| |  PHONE NUMBER |  LAYOUT | PHONE NUMBER |  LAYOUT |
| |  MEMO |  MULTI MEDIA |  MEMO |  MULTI MEDIA |
| |  INDIVIDUAL ENVIRONMENT | HOST DATA | INDIVIDUAL ENVIRONMENT | HOST DATA |
|  OPENED BOOK | 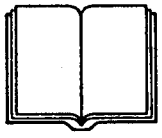 ADDRESS /PHONE NUMBER | 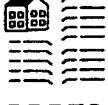 TELEPHONE NUMBER | ADDRESS /PHONE NUMBER |  EXTENSION TELEPHONE NUMBER |
|  | 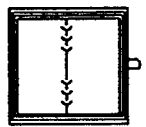 SCRAPBOOK | | SCRAPBOOK | |
| PROGRAM | TEXT SOURCE | | TEXT SOURCE | |

FIG. 17A
| · SOLID LINE<br>· DEFINED MODE<br>· MODE AFTER OPERATION | · DOT LINE<br>· DELETION<br>· MODE BEFORE OPERATION | · ALLOW<br>· TRANSFER<br>· CHANGE OF STATE | CLIP BOARD |
|---|---|---|---|
| 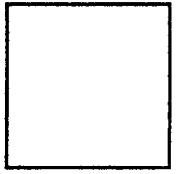 | 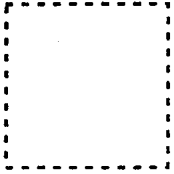 |  | 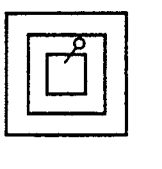 |
FIG. 17B
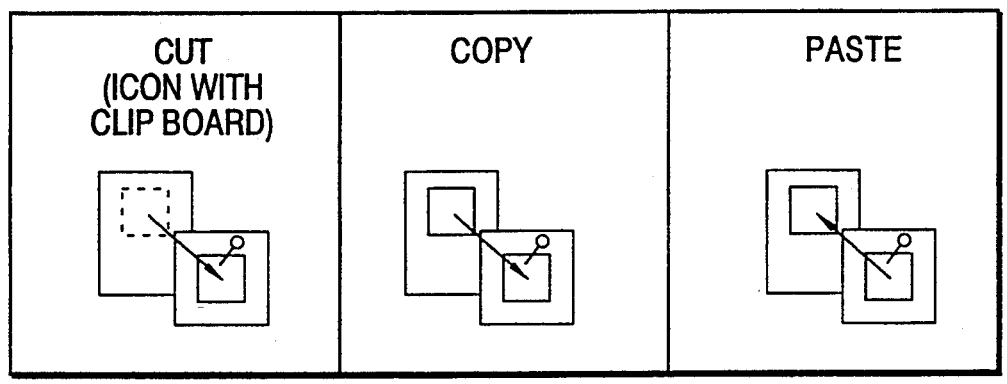
FIG. 17C
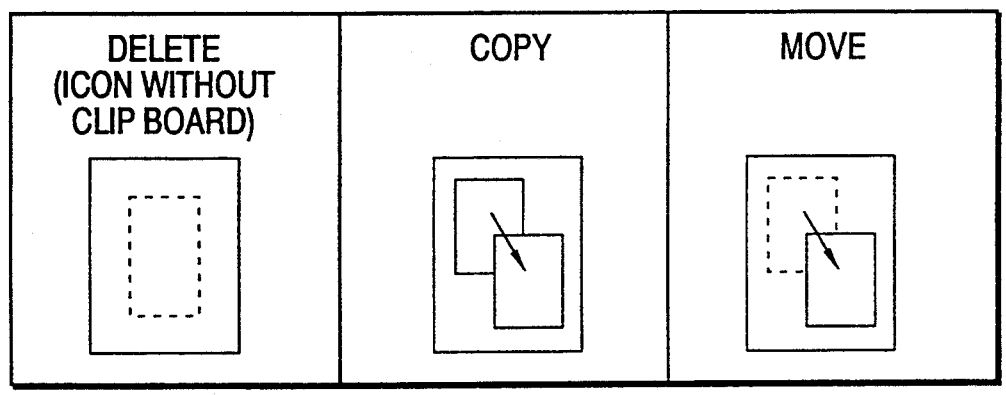

FIG. 18A

| DISPLAY CONTENT | DISPLAY RULE | ICON PATTERN |
|---|---|---|
| FOR ACTIVATION | ENCIRCLE THE OUTLINE OF A DATA SHEET PART | □ |
| FOR ACTIVATION AND FUNCTIONAL VARIETY | METAPHORS OF PRODUCTIONAL TOOL ARE PUT TOGETHER<br>• MOTIF CHOSEN SHOULD BE COMPREHENSIVE AND CHARACTERISTIC.<br>THE POSITION IS BASICALLY RIGHT BOTTOM | (pen icon) |
| FUNCTIONAL VARIETY, (VARIETY OF WORD PROCESSING AND SPREADSHEET CALCULATION) | FORMAT OF DATA SHEET PART | ≡ |
| NAME | EXPRESSING A SIMPLIFIED NAME OF THE APPLICATION (FOR MAKING A DISTINCTION BETWEEN THE APPLICATION OF SAME FUNCTIONAL VARIETY)<br>• THE TOP LETTER OF A NAME IS MADE A CAPITAL LETTER AND THE REST ARE MADE SMALL LETTERS | O$_{ASYS}$ |

AUTOMATIC ICON GENERATION SYSTEM

This application is a continuation, of application Ser. No. 07/610,586, filed Nov. 8, 1990, now abandoned.

BACKGROUND OF THE INVENTION

1. Field of the Invention

This invention relates to a computer input system, and more particularly to an automatic system of generating an icon displayed on the computer's display screen and selected by a user.

2. Description of the Related Art

With the recent increasing use of computers and the improvement in their display performance, a visionary method of comprehensively displaying the information necessary to use the computer, such as computing modes and operating instructions or menus, is sought. One such method uses an icon which is displayed as a pictorial character on a screen. This icon is selected by a user's mouse, and is used in lieu of a more traditional command input.

Kinds of icons used include a device icon that represents an operation related to an input or an output, an icon that represents data related to a file or text, an action icon that represents transfer and copy, and a status icon that represents mail is in a sending or receiving status. In existing computers, predetermined icons are stored in a memory device, read out as necessary, and displayed on a display screen in a fixed pattern according to a predetermined display sequence.

However, the numbers of commands, parameters and statuses for operating a computer increase with its functional improvement. Furthermore, if a computer's operating procedures become more complex, a small number of icons with a fixed graphic pattern cannot properly give the necessary information to a user. Hence, a large number of icons need to be provided. The design of such icons depends on manual labor, which necessitates much work and time. Also, a problem arises in that the necessary area of a memory device for storing a large number of icons becomes huge.

Another problem is that, when all designed icons are displayed on a computer display screen, they occupy too much of the display area. This confuses the user because icons not ordinarily used or those only infrequently used are also displayed.

SUMMARY OF THE INVENTION

An object of the invention is to automatically generate various icons by combining more basic graphic patterns, and thus to provide an icon displaying method in accordance with the use frequency.

A feature of the present invention resides in an automatic icon generation system comprising an icon pattern memory means for memorizing, as icon patterns, a plurality of graphic elements representing icon patterns combined to generate a plurality of icons used in a computer; an icon pattern synthesis means for synthesizing icon patterns memorized in the icon pattern memory means to generate an icon; an icon utilization control means for controlling the icon synthesis by said icon pattern synthesis means according to a user's input and for memorizing the utilization of all icons that can be synthesized by the icon synthesis means; and a display control means for displaying a plurality of icons on the display screen of the computer, according to the icon utilization, under the control of the icon utilization control means.

BRIEF DESCRIPTION OF THE DRAWINGS

FIG. 3 is a diagram that shows an embodiment of an icon synthesis using a noun icon pattern and a verb icon pattern;

FIGS. 13A through 13D are diagrams that show embodiments of icon synthesis rules using icon pattern libraries;

FIGS. 14A through 14H are diagrams that show embodiments for synthesizing various icons;

FIGS. 16A and 16B are diagrams that show embodiments that use three categories of icon patterns for synthesizing an icon;

FIGS. 17A, 17B and 17C are diagrams that show an embodiment of icon synthesis based on four icon patterns; and FIGS. 18A and 18B are diagrams that show an embodiment of synthesizing four icon patterns.

DESCRIPTION OF THE PREFERRED EMBODIMENTS

Figure 1A:
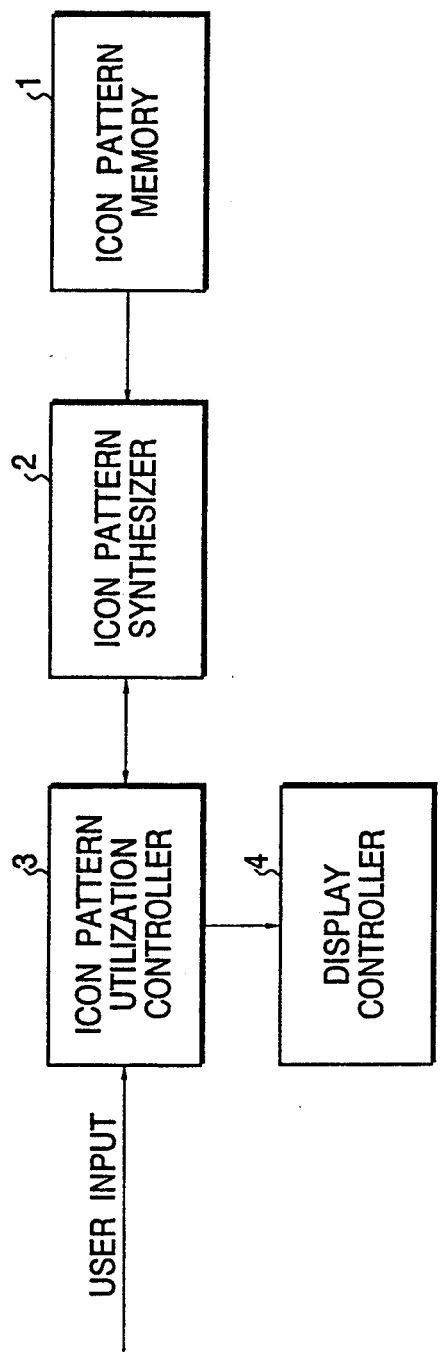
FIGS. 1A and 1B are principle block diagrams.
Figure 1B:
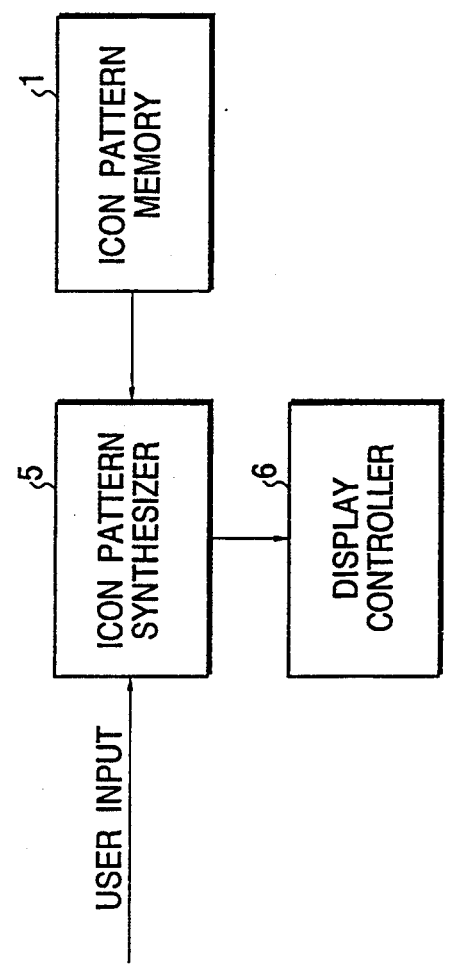

FIGS. 1A and 1B are block diagrams that show the principle of the present inventions. FIG. 1A is a block diagram showing a first principle of the invention. An icon pattern memory means 1 memorizes a plurality of graphic elements, as icon patterns, combined for expressing each icon. For example, a graphic rotating icon for rotating a graphic by a certain angle is made by combining a pattern representing a graphic and a pattern representing a rotation. The graphic pattern and the rotation pattern are stored as icon patterns in the icon pattern memory 1.

An icon pattern synthesizer 2 extracts icon patterns stored in the icon pattern memory 1 as necessary, and synthesizes an icon by combining those patterns. Instructions for the icons to be synthesized are provided by an icon utilization controller 3, which controls the icon synthesis by the icon pattern synthesizer 2 in accordance with a user's input, and maintained in formation on the utilization of all icons that can be synthesized by the icon pattern synthesizer 2, where the icon utilization status is controlled by a measure such as a statistical use frequency or a recent use sequence.

Based on the control by the icon utilization controller 3, a display controller 4 displays a plurality of icons on a display screen, such as a computer's CRT, according to an icon utilization, e.g. the recent icon utilization.

FIG. 1B is a block diagram showing the a second principle of the invention. The difference between FIG. 1A and FIG. 1B is that the icon utilization control means 3 does not exist in the latter. Hence, an icon pattern synthesizer 5 synthesizes an icon by combining icon patterns in the icon pattern memory 1 in accordance with a user's input. A display controller 6 displays the icon synthesized by the icon patterns synthesizer means 5 on the computer's display screen. The action of the icon pattern memory 1 is the same as that of the first invention.

In FIG. 1A, which shows the first principle of the invention, a user inputs the kinds of icons to be generated in the icon utilization controller 3. The icon utilization controller 3 controls all icons to be synthesized, and the icon pattern synthesizer 2 instructs that the icon be generated.

The icon pattern memory 1 comprises, for instance, a noun icon pattern library that stores noun patterns, such as of a graphic and a line, and a verb icon pattern library that stores verb patterns, such as of a rotation, a magnification and a compression. When the icon to be generated is, for instance, a graphic rotation icon, a graphic pattern and a rotation pattern are extracted respectively from the noun icon pattern library and the verb icon pattern library. The icon pattern synthesizer synthesizing 2 synthesizes the icon, which is passed through to the icon utilization controller 3, and the display screen displays the icon under the control of the display controller 4. Here, an area for displaying statistically frequently used icons and an area for displaying recently used icons are provided, e.g., on the display screen. The generated icons are displayed, e.g., in the region where recently used icons are displayed.

In FIG. 1B, which shows the second principle of the invention, a user inputs the kinds of icons to be generated directly into the icon pattern synthesizer 5. The icon pattern synthesizer 5 outputs the synthesized icons to the display controller means 6 and displays them on a display screen. Every other action is the same as that of the first invention.

As previously stated, these inventions enable various icons to be synthesized and displayed by combining a plurality of icon patterns.

Figure 2:
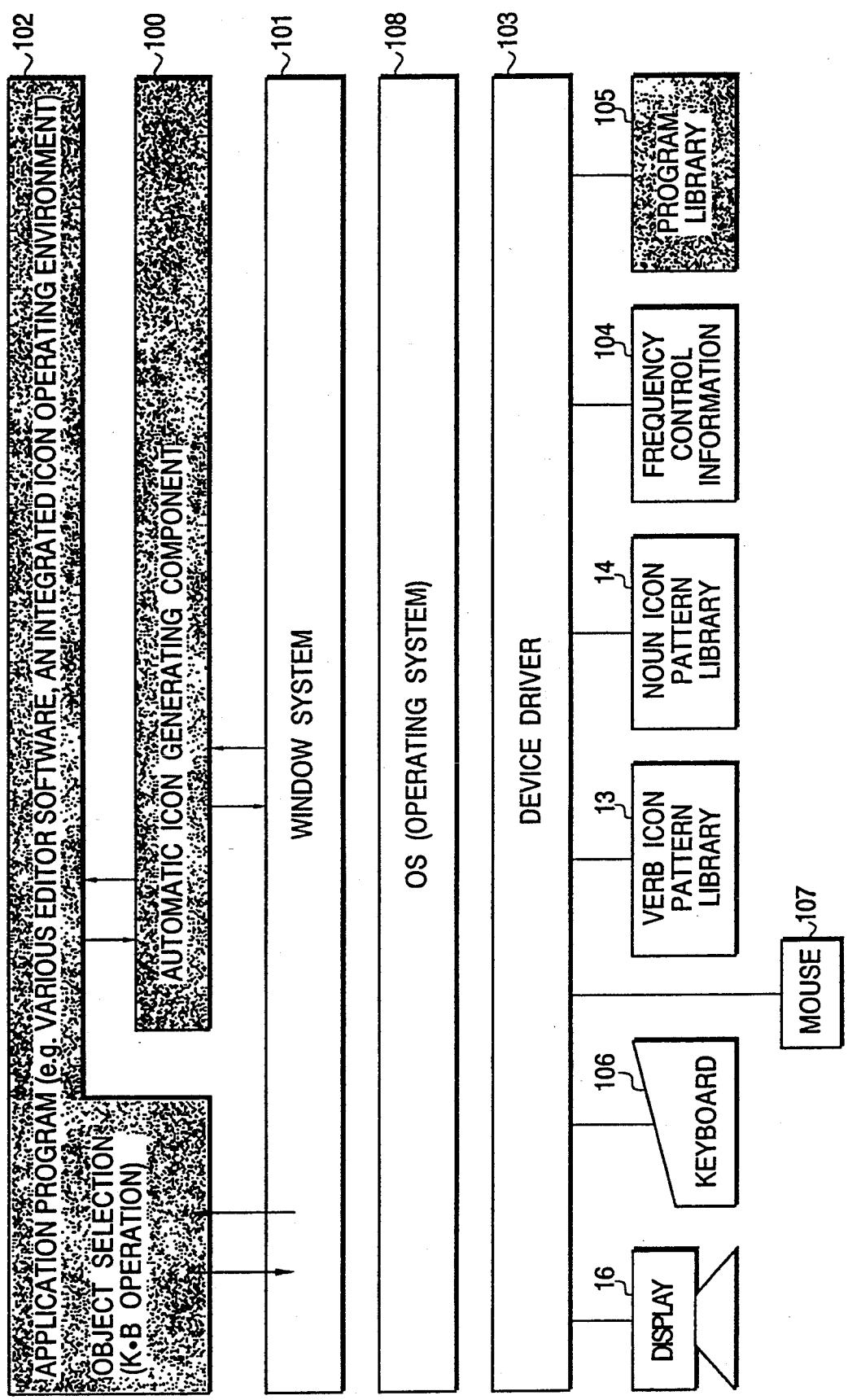
FIG. 2 is a block diagram that shows the system configuration of the computer system used in the automatic icon generation system of the present invention.

FIG. 2 is a block diagram showing the entire configuration of a computer system that executes the automatic icon generation methods of the preset invention. In FIG. 2, the automatic icon generation component 100 that executes the automatic icon generation method of the present inventions is located between a window system 101 and an application program 102. This component 100 selects the icon and displays it. A device driver 103 of the system is connected with a frequency control information unit 104, a program library 105, a keyboard 106, a mouse 107, a display 16, a verb icon pattern library 13 and a noun icon pattern library 14. The entire system is controlled by an operation system (OS) 108. The verb icon pattern library 13 and the noun icon pattern library 14 are explained in FIG. 3 and FIG. 4.

FIG. 3 shows an embodiment of an icon synthesis using a noun icon pattern and a verb icon pattern. In FIG. 3, there are patterns of texts, words, characters, graphics, lines and dots as the noun icon pattern; and there are deletion, copying, pasting-in, erasing, rotation, magnification/compression, creation and revision, as the verb icon pattern. By combining one of the noun icon patterns with one the verb icon patterns, various icons are synthesized. For instance, in a text deletion icon synthesized by a text icon pattern and a deletion icon pattern, it is shown in the upper rectangle that what is deleted is a text, and in a lower right rectangle clip board that the deleted text is saved in the computer memory. For example, the meaning of a text-copying icon and a text-pasting-in icon is similar.

In FIG. 3, graphic patterns for indicating icon patterns are provided in correspondence with a word such as a verb or a noun, and such graphic patterns are put together. Namely, a comprehensive icon is synthesized by an "OR" synthesis. For instance, a triangle among noun icon patterns for expressing a graphic pattern and a rounded arrow mark for expressing a rotation pattern among verb icon patterns are put together to form a graphic rotation icon.

Figure 4:
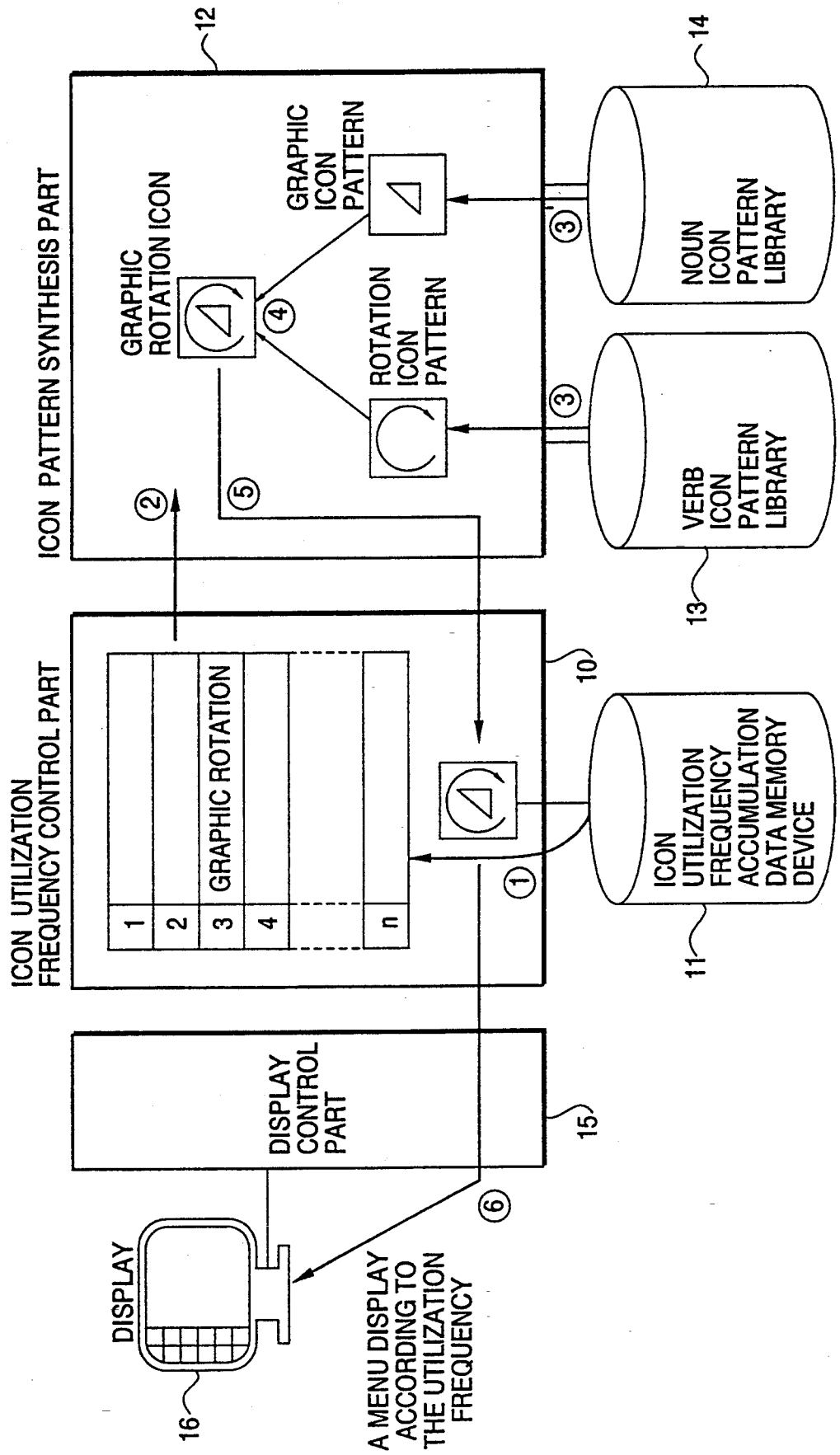
FIG. 4 is a block diagram that shows an embodiment of an automatic icon generation system.

FIG. 4 is a block diagram that shows the an embodiment of an automatic icon generation method. In FIG. 4, procedures through indicate the flow of icon generation and its display control. The automatic icon generation method is explained, assuming that a user inputs a demand to generate a graphic rotation icon to the icon utilization frequency control part 10. Icon utilization frequency storage data memory device 11 stores, e.g., the kind of an icon pattern for synthesizing each icon, in addition to data such as statistical utilization frequency of each synthesizeable icon. The icon utilization frequency control part 10 extracts the kinds of icon patterns necessary to synthesize a graphic rotation icon in procedure and outputs them to the icon pattern synthesis part 12 in procedure.

The icon pattern synthesis part 12 simultaneously extracts a rotation pattern and a graphic pattern respectively from the verb icon pattern library 13 and the noun icon pattern library 14 in procedure synthesizes a graphic rotation icon from those two patterns in procedure and outputs it to the icon utilization frequency control part 10 in procedure.

The icon utilization frequency control part 10 registers the generation of the graphic rotation icon which is displayed on the display 16 as an icon menu under the control of the display control part 15 in procedure. The control by the icon utilization frequency control part 10 selects the icons displayed on the display 16 according to the utilization frequency. The generated graphic rotation icon is displayed, e.g., in the display area of the recently used icons.

Figure 5:
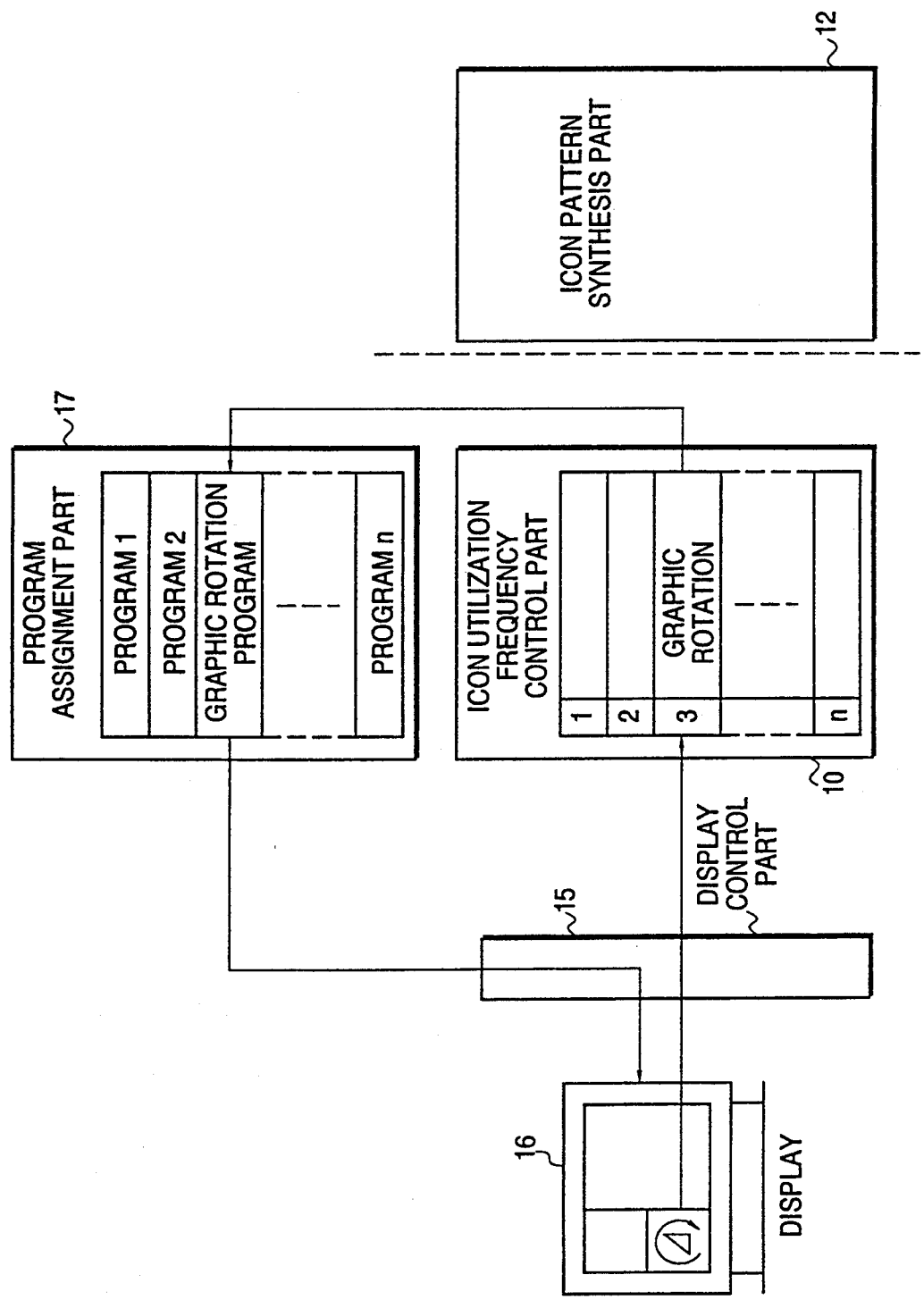
FIG. 5 is a diagram that shows the flow of the program execution when an icon is selected.

FIG. 5 shows an embodiment of a flow of program execution of the icon the user selects from the icon menu on the display screen, e.g., with a mouse. In FIG. 5, the icon selected on the screen of the display 16 is inputted to the icon utilization frequency control part 10 under the control of the display control part 15. Assuming the selected icon is the graphic rotation icon, the icon utilization frequency control part 10 instructs a graphic rotation program stored in a program assignment part 17 to be executed, and a graphic on the display 16 is rotated under the control of the display control part 15.

Figure 6:
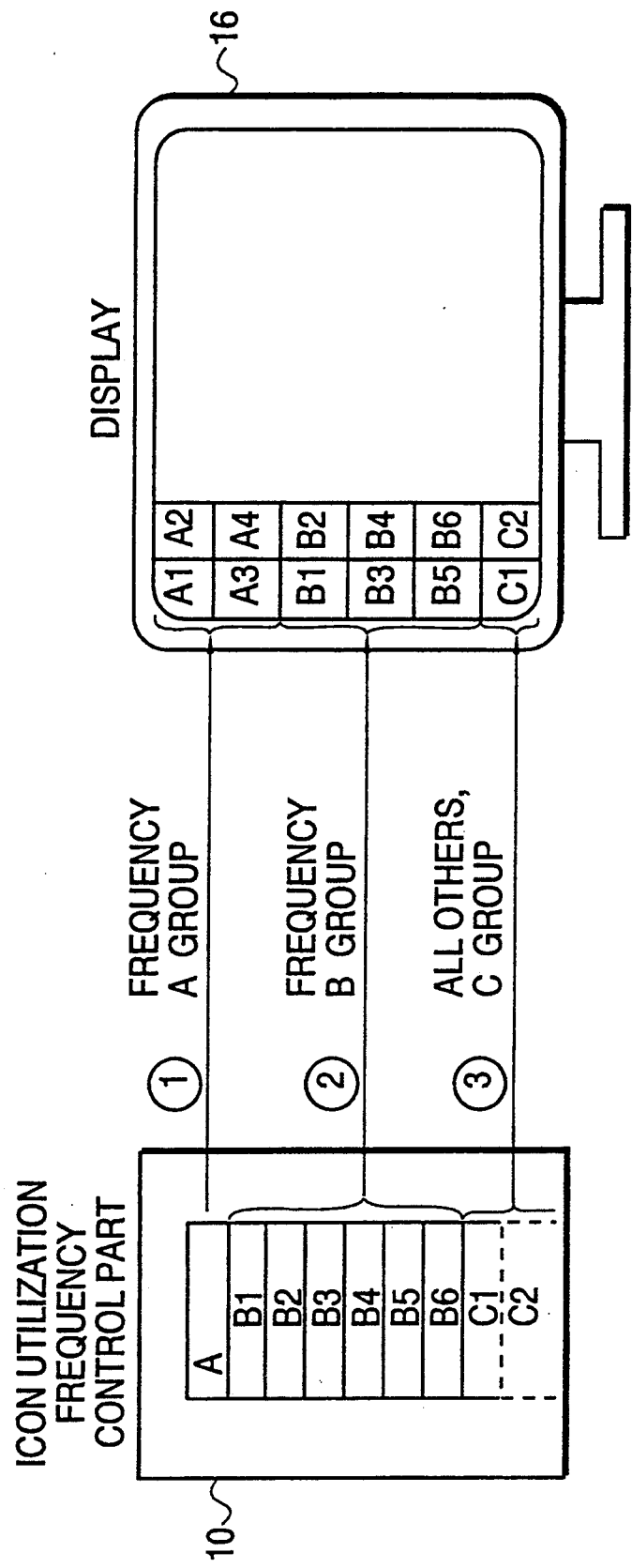
FIG. 6 is a diagram that shows the embodiment of an icon display control system, according to the utilization frequency.

FIG. 6 shows an embodiment of an icon display control method. In FIG. 6, the icon display area on the screen of the display 16 is divided into three areas: one for displaying icons of A group which statistically has a high utilization frequency; another for displaying icons of B group which the user has recently used; and the other for displaying icons of C group, which are others such as those that are absolutely necessary at the time of screen editing.

The icon utilization frequency control Dart 10 in itself controls each icon by the group it belongs to. Because of a self-learning function of the icon utilization control part 10, the less frequently used icons are displayed later and the frequently used ones are displayed earlier.

Figure 7:
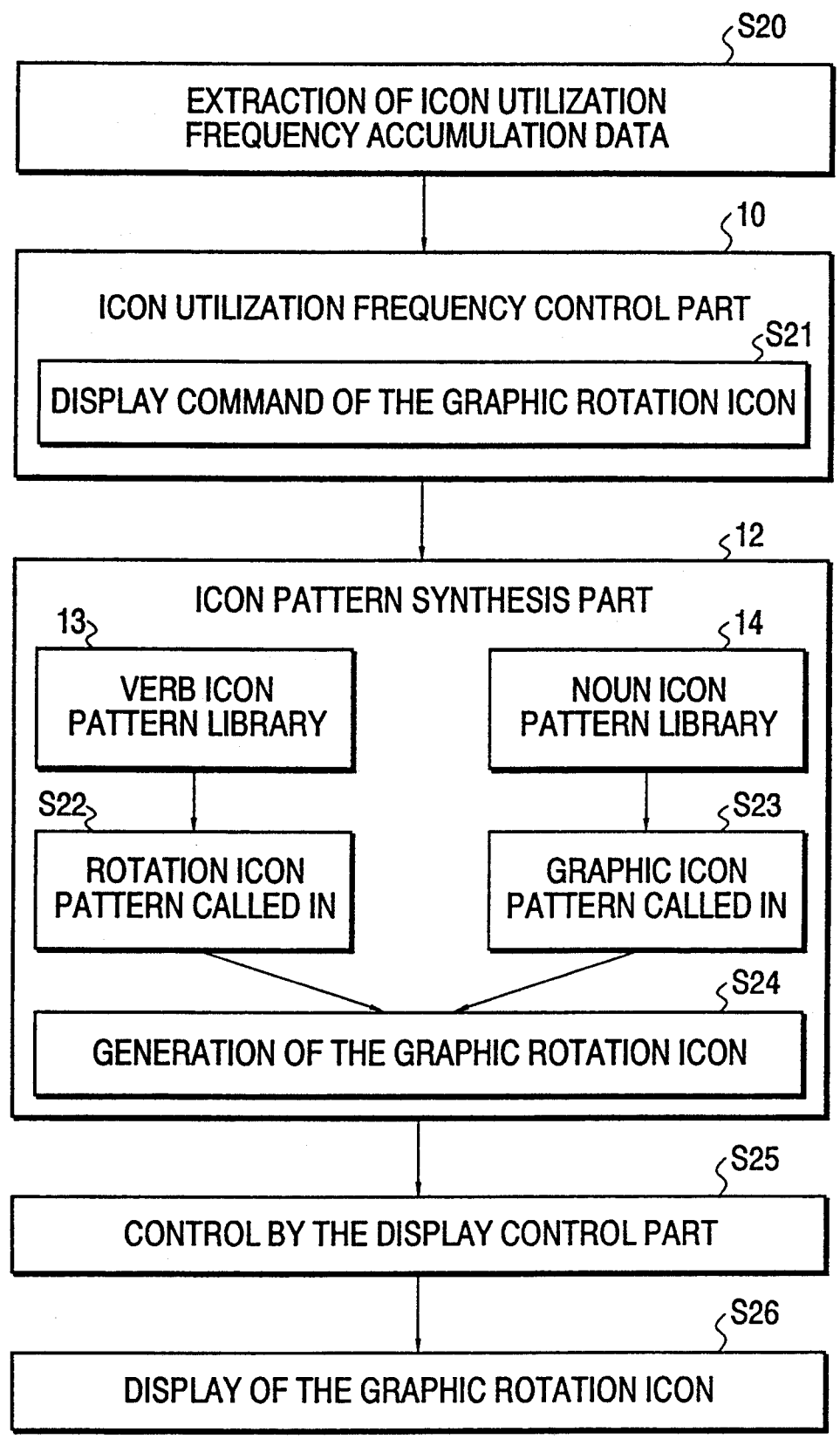
FIG. 7 is a flow chart that shows how an icon is generated and displayed.

FIG. 7 is a flow chart of an embodiment of the icon generation and its display. In FIG. 7, when the user inputs e.g. a demand to generate a graphic rotation icon, icon utilization frequency accumulation data showing the kinds of icon patterns necessary for the synthesis are extracted from the icon utilization frequency accumulation data memory device 11 shown in FIG. 4 in step 20. The icon utilization frequency control part 10 generates a command to display the graphic rotation icon with the icon utilization frequency accumulation data in step 21. The command is inputted to the icon pattern synthesis part 12. The rotation icon pattern is called in from the verb icon pattern library 13 in step 22. The graphic icon pattern is called in from the noun icon pattern library 14 in step 23. The graphic rotation icon is generated in step 24. The display control part 15 controls the generated graphic rotation icon in step 25. The icon is displayed in step 26.

Figure 8:
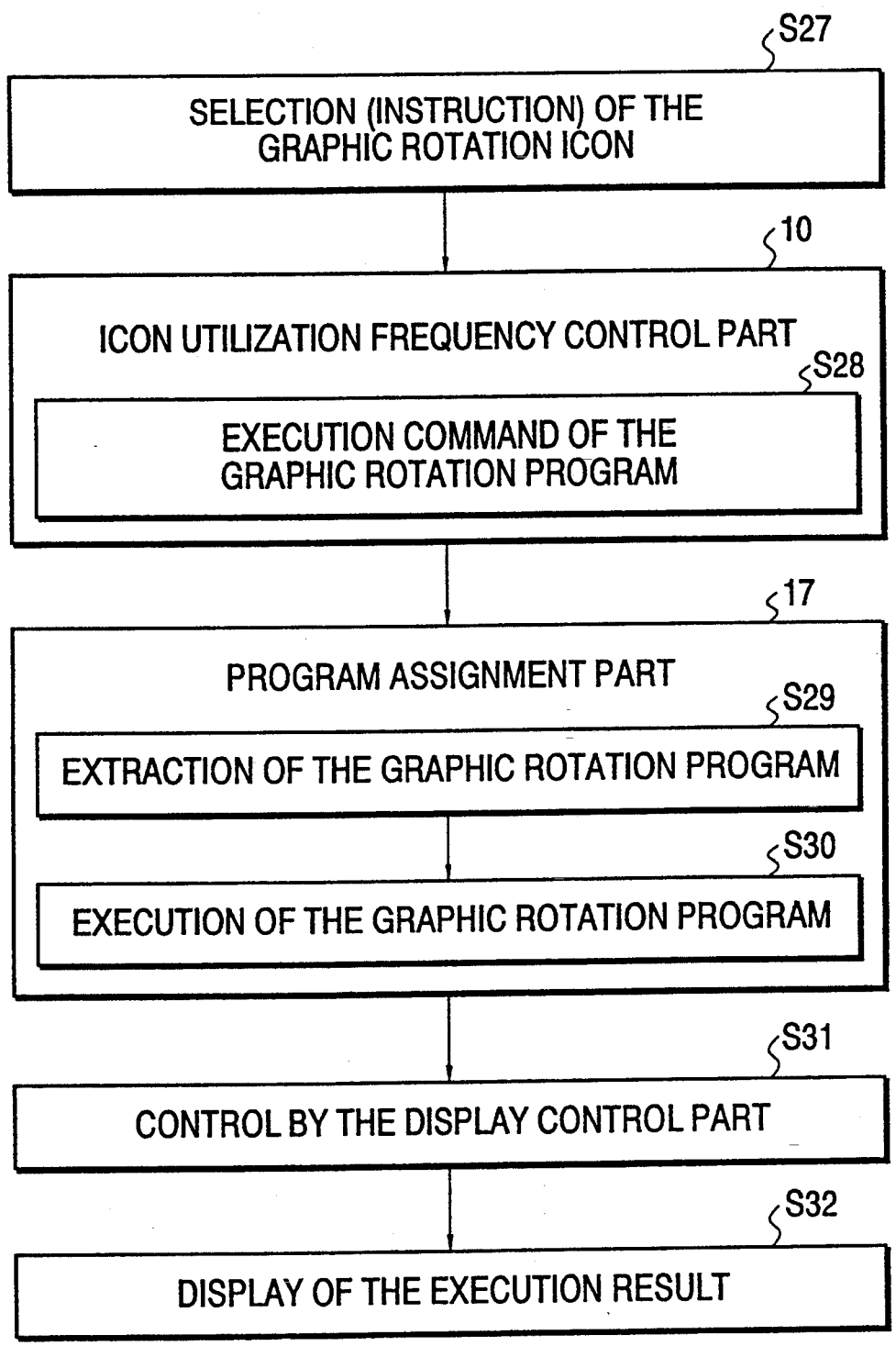
FIG. 8 is a flow chart that shows an embodiment of an icon selection and a program execution.

FIG. 8 is a flow chart showing an embodiment of an icon selection by the user and the program execution. In FIG. 8, assuming that the user selects the graphic rotation icon from the icon menu on the display screen in step 27, the icon utilization frequency control part 10 creates a command to execute a graphic rotation program in step 28. The command is inputted to the program assignment part 17 which extracts the graphic rotation program in step 29 and executes it in step 30. The display control part controls the result of executing the program in step 31. This result is then displayed on the display screen in step 32.

Figure 9A:
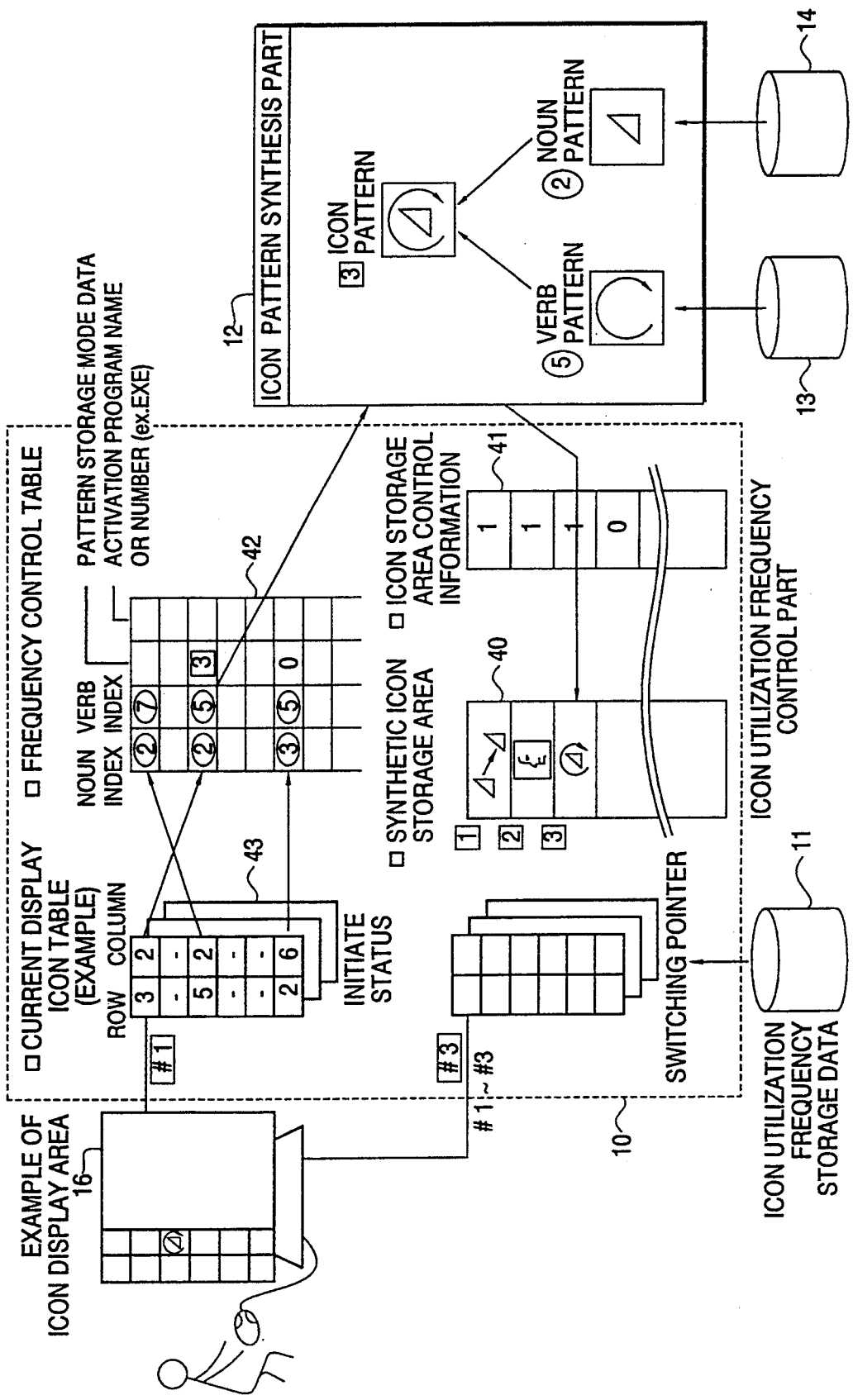
FIGS. 9A and 9B are diagrams that show an embodiment of the actions of a icon utilization frequency control part.
Figure 9B:
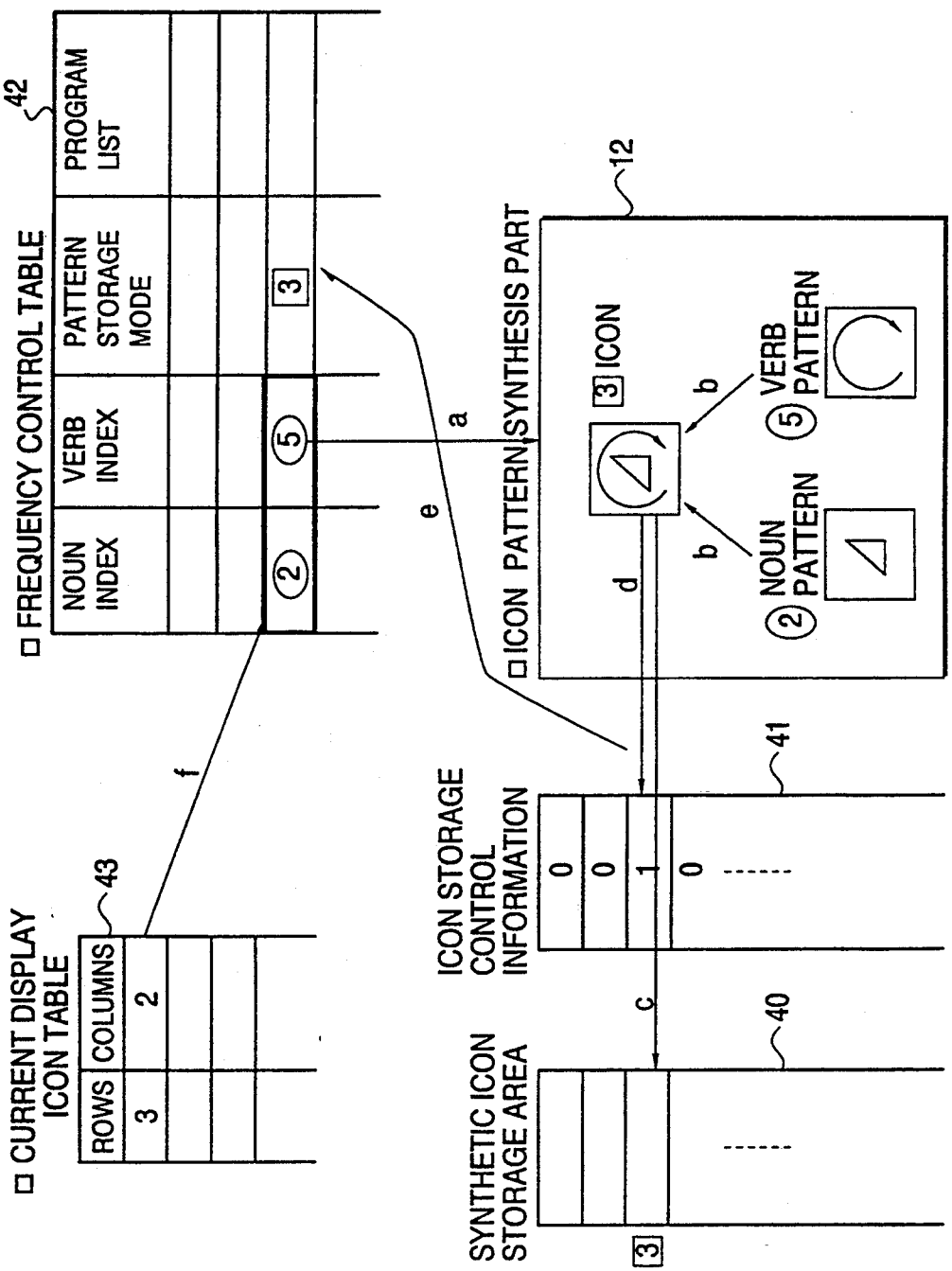

FIG. 9A and FIG. 9B show an embodiment of the action of the icon utilization frequency control part 10. In FIG. 9A, icon utilization frequency control part 10 is provided with the following components: a synthetic icon storage area 40 for storing an icon synthesized by the icon pattern synthesis part 12; an icon storage area control information unit 41 that shows whether or not each corresponding position of icon storage positions [1], [2], [3], .... in the Synthetic icon storage area 40 stores an icon, by indicating "1" if an icon is stored and "0" if an icon is not stored; a noun index that shows a noun pattern in the noun icon pattern library 14 and a verb index that shows a verb pattern in the verb icon pattern library 13, corresponding respectively to each synthetic icon; pattern storage status data that shows he storage position as storage positions [1], [2], [3], ... . described earlier, when the synthetic icon storage area 40 stores an icon by combining any of these noun indices and any of these verb indices; a frequency control table 42 that stores a number or a name of the program activated when the program is executed for the synthetic icon; and a display icon table 43 that is updated according to the change of the icon displayed on the display screen equipped with a pointer to the frequency control table 42 and its display position on the icon screen displayed on the display 16.

The display icon table 43 is updated according to the switching of the icon menu displayed on the display 16, e.g. when the user inputs a switching command, so that the pointer is switched to the frequency control table 42.

FIG. 9A shows that the display icon table corresponding to the icon menu currently displayed on the screen of the display 16 is the current display icon table.

In FIG. 9A, when an icon is generated, the icon pattern synthesis part 12 extracts the appropriate icon pattern from the noun pattern index and the verb pattern index in the frequency control table 43 for synthesis. The synthesized icon is stored in an empty area in the synthetic icon storage area 40, based on the icon storage area control information 41. The contents of the display icon table 43 which is the origin of the pointer to the frequency control table 42, namely, the positions corresponding to the row and column for indicating the X or Y coordinate of the display position on the display screen 16, are displayed as the icon menu.

FIG. 9B shows an embodiment of the information flow e.g. at the time of synthesis and display of a graphic rotation icon. In FIG. 9B, the noun index and the verb index from the frequency control table 42 are inputted to the icon pattern synthesis part 12 in step "a" and the graphic rotation icon is synthesized in step "b". The synthesized icon is stored in the storage position 3 in the synthetic icon storage area 40 in step "c" and at the same time the corresponding bit of the icon storage area control information 41 is turned to "1" in step "d". Then, in step "e" the pattern storage mode data in the frequency control table 42 are set at the position [3] in the storage area 40 of the synthetic icon, which is displayed on the display 16 in the third row, second column by the pointer from the display icon table 43 in step "f".

Figure 10:
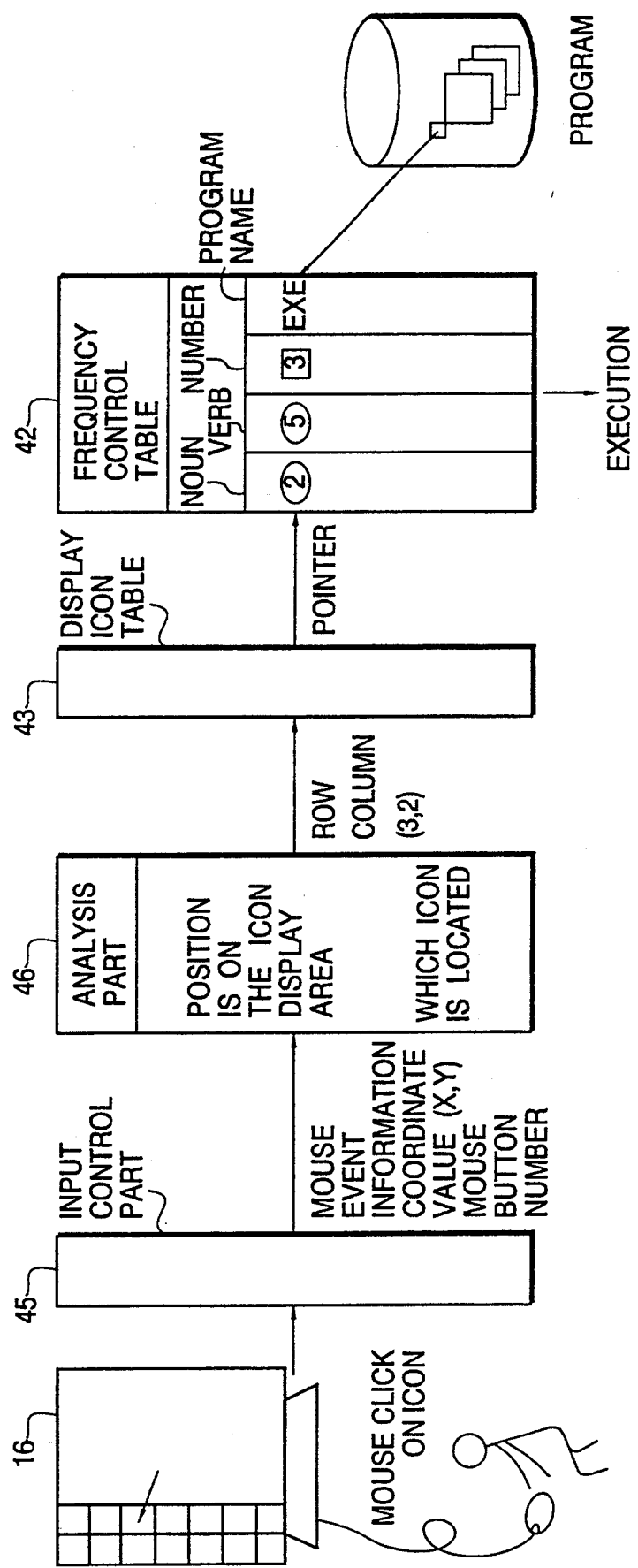
FIG. 10 is a diagram that shows an icon selection and a program execution.

FIG. 10 shows an embodiment of a program execution and an icon selection. In FIG. 10, when the user instructs the program execution of an icon on the icon menu display area of the display 16, e.g., by a mouse click, mouse event information comprising the icon display coordinate values X and Y and the mouse button number are inputted to an analysis part 46 through an input control part 45, so that analyses are performed to determine whether the mouse click position is on the icon display area and on which icon it is located. The icon display position data, e.g., data in the format of third row and second column, are outputted. The pointer indicated by the display icon table 43 searches the content of the frequency control table 42. The number or name of the program to be activated is extracted, and the program is executed.

Figure 11A:
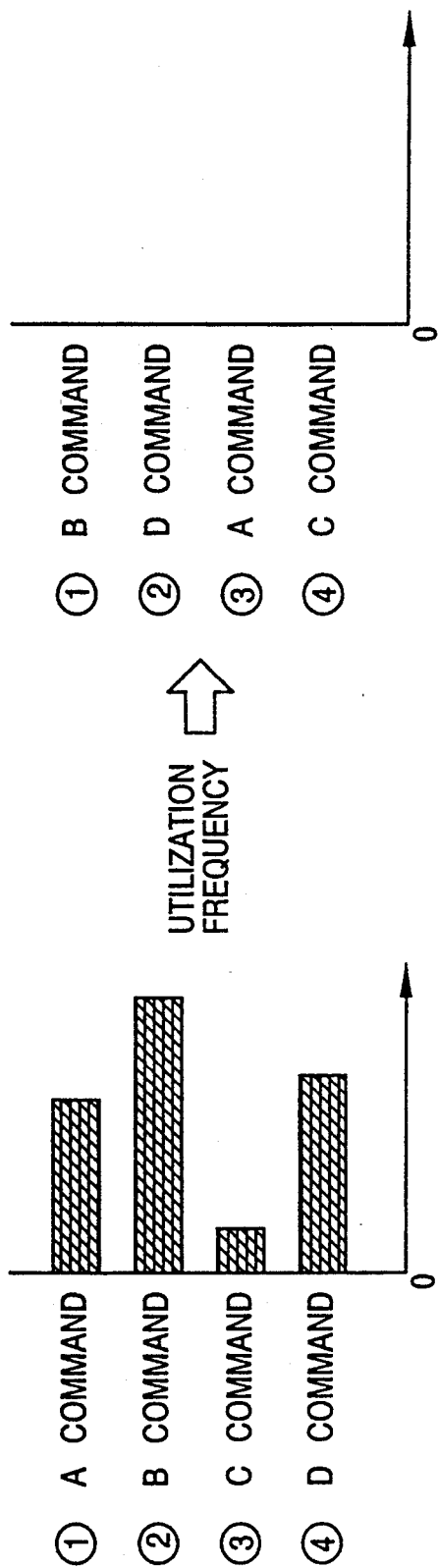
FIGS. 11A and 11B are diagrams that show an embodiment of a system of controlling the icon utilization frequency accumulation data.
Figure 11B:
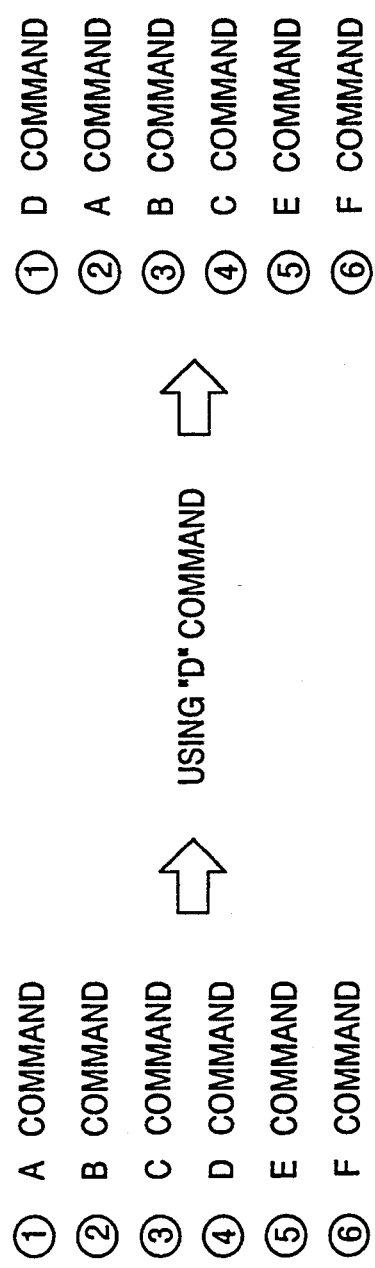

FIG. 11A and FIG. 11B show an embodiment of a method of controlling the icon utilization frequency accumulation data memorized in the icon utilization frequency accumulation data memory device 11 shown in FIG. 4.

FIG. 11A shows a method of prioritizing the display of statistically frequently-used icons, in which method past icon utilizations, e.g., of a few thousand times, are recorded and the display priorities A, B, C, . . . . are changed according to the result. Here, for for instance, "A" command is a utilization command of "A" icon.

FIG. 11B shows a method of prioritizing the display of recently used icons. For instance, immediately after a utilization command of "D" icon is inputted, "D" command has the first display priority.

Figure 12:
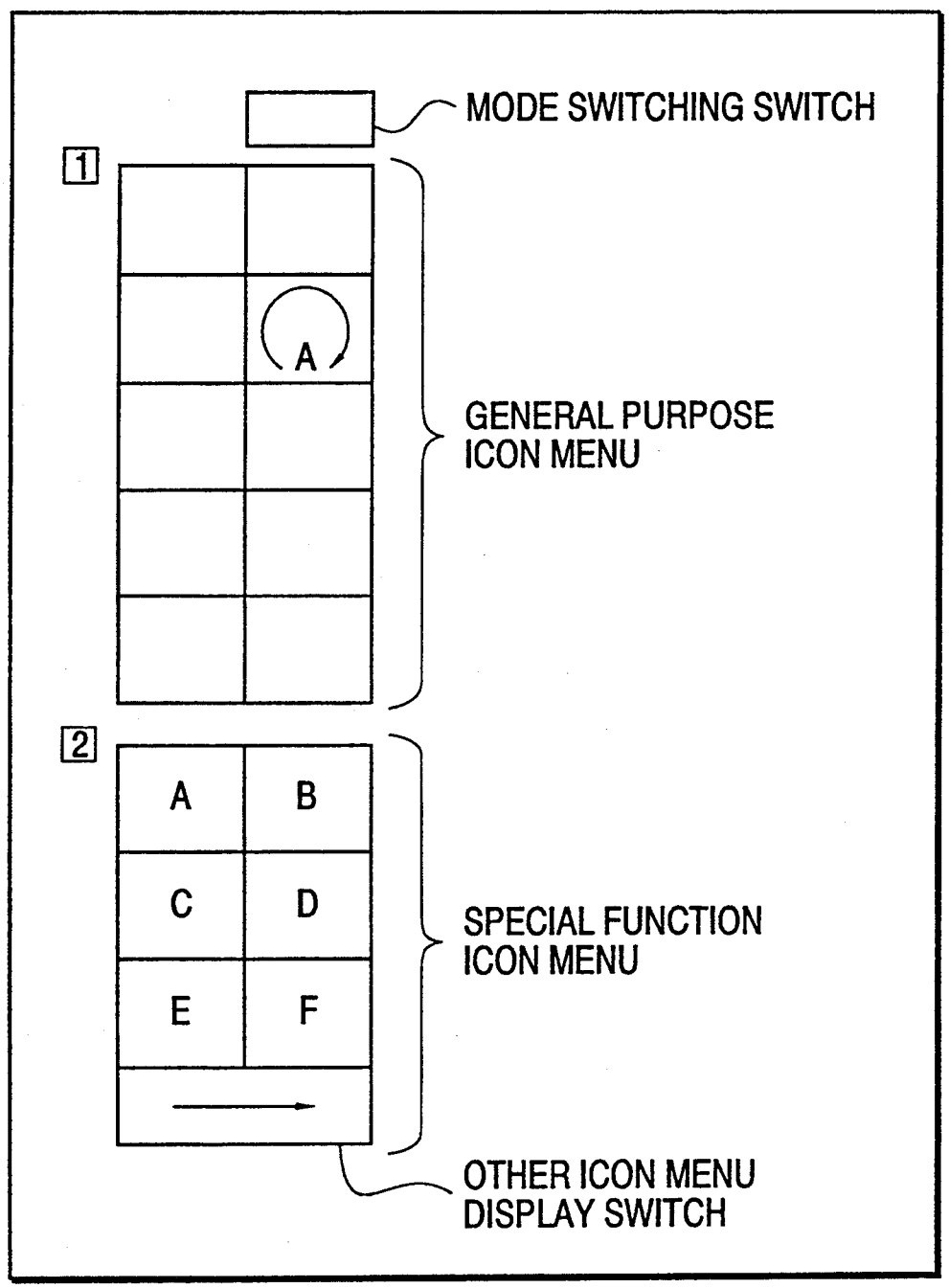
FIG. 12 is a diagram that shows an embodiment of an icon menu display.

FIG. 12 shows an embodiment for displaying icons on a display screen, i.e. of an icon menu. In FIG. 12, icon menus are subdivided into display area ① for a general purpose icon menu of frequently used basic functions and display area ② for icons with special functions, such as an unfocusing function.

In FIG. 12, the content of display area ① for the general purpose icon menu is switched, e.g., by a command input for changing the image mode to a vector mode or by a switching input from a switch for switching the mode on the display. The display content of display area ② for a special icon menu is changed, e.g., by the earlier described method of prioritizing the display of the most recently utilized icon. Assuming that an icon command displayed in area "D" is executed, the "D" icon is displayed in the "A" position. For icon menus that cannot be displayed, a switch for displaying another icon menu can switch the content of the special icon menu. According to the switching of these icon menus, the current display icon table shown in FIG. 9A, is switched from #1 to #3, and a pointer is redirected.

FIGS. 13A, 13B, 13C and 13D show an embodiment of an icon synthesis rule using an icon pattern library. In FIGS. 13A, 13B, 13C and 13D, "A" and "B" each representing an icon library can be any combination among the following: a library representing a part of speech such as noun, verb, adverb and adjective; a library representing a basic graphic; a library representing a generated icon; and a library of expression rules, such as a dotted line expression and a red color expression.

FIG. 13A shows an embodiment of an "OR" synthesis rule for putting together the icon pattern of "A" library and the icon pattern of "B" library "as is". "A" library indicates a sheet form, and "B" library indicates a basic graphic indicating the content of such things as a text and a graphic described on the sheet. The pattern of "A" library and that of "B" library are "OR" synthesized and icons are generated.

FIG. 13B shows an embodiment of a rule for obtaining a synthetic icon by finding the logical product (AND) between the icon pattern of "A" library and the icon pattern of "B" library. Here, a synthetic icon is generated by an "AND" synthesis of a network pattern as a content of "A" library and a text or a graphic of "B" library.

Figure 13C:
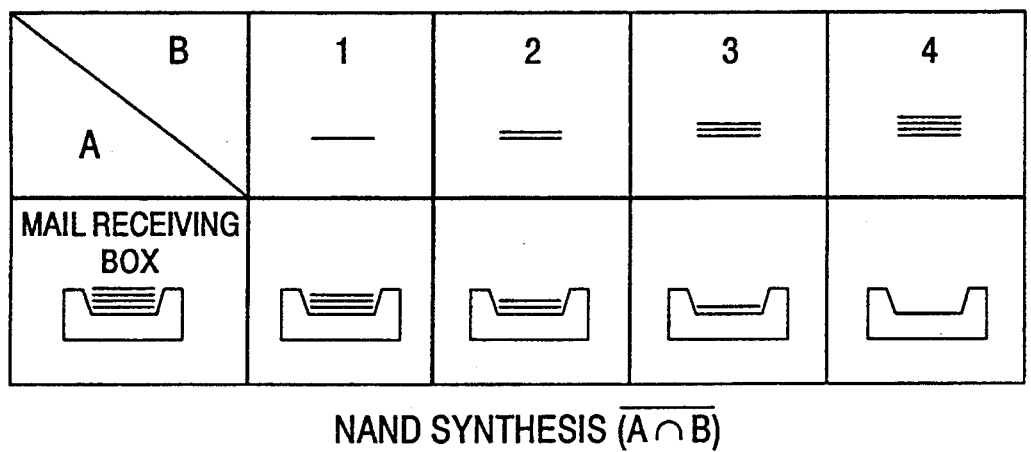

FIG. 13C shows an embodiment of a "NAND" synthesis rule for combining a pattern of "A" library and a pattern of "B" library. Here, the content of "A" library is a pattern of a mail receiving box which is a generated icon, and the content of "B" library is a pattern for expressing the amount of mail taken out of the mail receiving box. A "NAND" synthesis of a pattern of "A" library and a pattern of "B" library produces a synthetic icon of a mail receiving box whose mail is reduced as a result of taking out mail in the amount displayed in the pattern of "B" library from the receiving box after opening it.

Figure 13D:
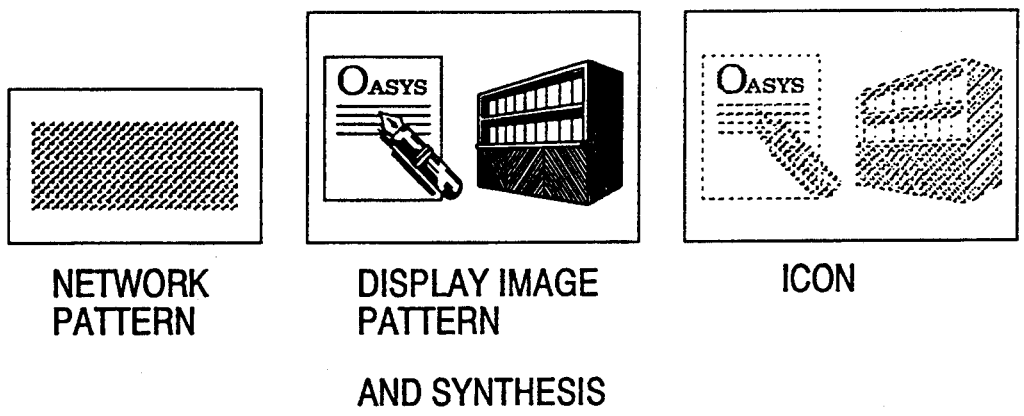

FIG. 13D shows another example of an "AND" synthesis. In this example, a network pattern and a display image pattern are synthesized.

FIGS. 14A through 14H show embodiments of various icon syntheses.

In FIG. 14A, one of the patterns that are various graphics of "B" library, such as a circle, is combined with the outline pattern of "A" library to generate a synthetic icon.

In FIG. 14B, one of the various line patterns such as a parallel line of "B" library is combined with the outline pattern of "A" library to generate a synthetic icon.

In FIG. 14C, the registration pattern of "B" library and the dictionary pattern of "A" library synthesize a dictionary registration icon.

In FIG. 14D, the component book pattern of "A" library is combined with a graphic pattern of "B" library to generate a synthetic icon.

In FIG. 14E, the printer pattern of "A" library is combined with the sheet number pattern of "B" library to realistically display the number of sheets already printed.

FIG. 14F shows an example of a synthetic icon used for editing a text which is synthesized by combining an outline pattern and one of the editing patterns such as one for centering.

FIG. 14G shows an example of a file searching icon which is synthesized by combining a searching pattern and one of the object patterns.

FIG. 14H shows an example of a synthetic icon used for designating a displayed page which is synthesized by combining a page pattern and one of the designating patterns.

Figures 15A, 15B:
FIGS. 15A and 15B are diagrams that show an embodiment of an icon that reflects a subtle mode difference.

FIGS. 15A and 15B show embodiments of icon generations that reflect subtle differences in state.

In FIG. 15A, a verb icon pattern indicating a mail receipt and one of the noun icon patterns indicating the content, i.e., the attribute of the received mail, such as a text, a graphic or a voice, are put together.

In FIG. 15B, a verb icon pattern indicating a mail receipt and one of the adverb icon patterns indicating the amount of received mail, are synthesized such that the content of the synthetic icon reflects a subtle change in the mail number.

So far, a synthesis of two icon patterns, each representing a pattern of speech, has been explained. Examples include the synthesis of a noun pattern and a verb pattern or of a verb pattern and an adverb pattern. This synthesis assumes that each of the icon pattern libraries that the icon pattern synthesis part 12 synthesizes represents a pattern of speech. The number of icon pattern libraries underlying a synthesis can be more than two. For instance, a synthetic icon such as a confidential text mail is generated by a combination of an adverb icon pattern, a noun icon pattern and a verb icon pattern.

FIG. 16A and 16B show examples of three icon patterns for synthesizing an icon. For example, an icon is generated by combining a data sheet in the control format pattern, a text in the medium attribute display pattern, and a text in the service attribute display pattern.

FIGS. 17A, 17B and 17C show an embodiment of an icon synthesis, based on four icon patterns. By properly combining the icon patterns, comprising a solid line, a dotted line, an arrow and a clip board, shown in FIG. 17A, an icon with a clip board and an icon without a clip board are synthesized respectively in FIG. 17B and FIG. 17C.

Figure 18B:
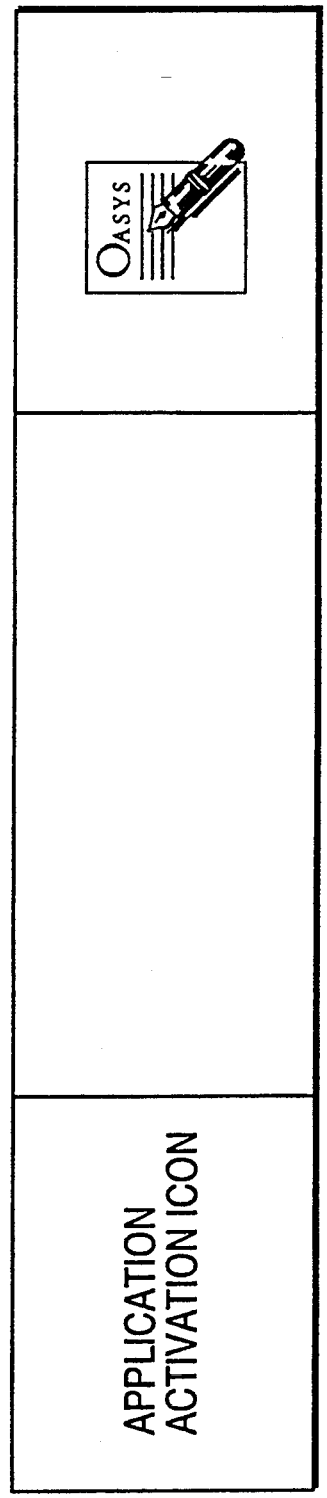

FIG. 18A and FIG. 18B show an embodiment for synthesizing four icon patterns. The four icon patterns shown in FIG. 18A are synthesized and the application activation icon shown in FIG. 18B is generated.

The automatic icon generation method of the present invention described above can be applied widely to personal computers, work stations, word processors and other information equipment.

What is claimed is:

1. An automatic icon generation system for a computer having a display screen, comprising:
   icon pattern memory means for storing graphic elements representing icon patterns to be combined to generate icons used in the computer;
   icon pattern synthesis means for combining icon patterns stored in said icon pattern memory means to generate an icon;
   icon utilization control means, for receiving user input related to the icons, for controlling icon synthesis by said icon pattern synthesis means according to the user input, and for monitoring utilization frequency by a user of all the icons that can be synthesized by said icon pattern synthesis means; and
   display control means for displaying the icons on the display screen of the computer, according to the utilization frequency of the icons, under control of said icon utilization control means.

2. The automatic icon generation system according to claim 1, wherein said display control part controls the display screen to include a first area for displaying at least one statistically highly-utilized icon, a second area for displaying at least one recently-utilized icon, and a third area for displaying at least one icon required for screen editing, based on statistics obtained by said icon utilization control means.

3. The automatic icon generation system according to claim 1, wherein said icon pattern synthesis means synthesizes two icon patterns by performing a logical OR of binary display data of each picture element defined in the two icon patterns.

4. The automatic icon generation system according to claim 1, wherein said icon pattern synthesis means synthesizes two icon patterns by performing a logical AND of binary display data of each picture element defined in the two icon patterns.

5. The automatic icon generation system according to claim 1, wherein said icon pattern synthesis means synthesizes two icon patterns by performing a logical of binary display data of each picture element defined in the two icon patterns.

6. An automatic icon generation system according to claim 1, wherein the computer executes, under control of an operating system, an application program and a window system which pass information therebetween for selection and display of all the icons via said icon pattern synthesis means, said icon utilization control means and said display control means, and
   wherein said icon pattern memory means comprises a disk driver for controlling storage of a verb icon pattern library, a noun icon pattern library, frequency control information and a program library.

7. An automatic icon generation system for a computer having a display screen, comprising:
   icon pattern memory means for storing graphic elements of icon patterns representating nouns and verbs in noun and verb libraries, respectively;
   icon pattern synthesis means for combining icon patterns stored in said icon pattern memory means to generate icons used in the computer, said icon pattern synthesis means including a pattern synthesis part, connected to said noun and verb libraries, to extract the icon patterns to be combined from the noun library and the verb library, to perform a synthesis operation using predefined rules on the icon patterns extracted from the noun and verb libraries and to output a demanded icon;
   icon utilization control means for receiving user input related to icons, for controlling icon synthesis by said icon pattern synthesis means according to the user input and for monitoring utilization frequency by a user of all the icons that can be synthesized by said icon pattern synthesis means, said icon utilization control means including;
      an icon utilization frequency accumulation data memory device to store icon pattern types and frequency of use; and
      an icon utilization frequency control part connected to said icon utilization frequency accumulation data memory device, to receive a user demand for icon generation, to extract icon pattern types to be combined to generate the demanded icon, from said icon utilization frequency accumulation data memory device and to output the icon pattern types; and
   display control means for displaying the icons on the display screen of the computer according to the utilization of the icons, under control of said icon utilization control means, said display control means including a display control part, connected to said icon utilization frequency control part, to display the demanded icon on the display screen of the computer in an icon menu.

8. The automatic icon generation system according to claim 7,
   wherein said display control part receives designation information of a selected icon, including a program execution command, selected by a user from among the icons in an icon menu displayed on the display screen of the computer,
   wherein said icon utilization frequency control part receives the designation information and outputs the program execution command, and
   wherein said automatic icon generation system further comprises a program assignment part connected to said icon utilization frequency control part and said display control part, to extract and executed an icon program corresponding to the program execution command to produce an execution result for display on the display screen under control of said display control part.

9. The automatic icon generation system according to claim 8, wherein said icon utilization frequency control part comprises;
   a synthetic icon storage area, connected to said icon pattern synthesis part to store icons synthesized by said icon pattern synthesis part;
   an icon storage area control information table, connected to said icon pattern synthesis part, to indicate whether each corresponding storage position in said synthetic icon storage area contains a synthesized icon;
   a frequency control table, connected to said icon pattern synthesis part and said program assignment part, for storing pattern storage mode data for each synthesized icon, including a noun index of a noun icon pattern in said noun icon pattern library, a verb index of a verb icon pattern in said verb icon pattern library and an icon index for a synthesized icon, indicated by the noun index and verb index, in said synthetic icon storage area and a program name of a program to be executed for the synthesized icon; and a display icon table connected to said display control part and said frequency control table, updated according to changes in the icons displayed on the display screen of the computer, each entry in said display icon table including a pointer to said frequency control table and a display position of a corresponding icon displayed on the display screen.

10. An automatic icon generation method for a computer having a display screen, comprising the steps of:
 (a) storing graphic elements representing icon patterns;
 (b) receiving a user input indicating a new icon;
 (c) synthesizing at least two of the icon patterns stored in step (a) to generate the new icon according to the user input;
 (d) monitoring utilization frequency of a plurality of icons by a user than can be synthesized; and
 (e) displaying a portion of the plurality of icons on the display screen of the computer, according to said monitoring in step (d).

* * * * *

UNITED STATES PATENT AND TRADEMARK OFFICE
CERTIFICATE OF CORRECTION

PATENT NO. : 5,367,626

DATED : November 22, 1994

INVENTOR(S) : Makoto MORIOKA et al.

It is certified that error appears in the above-indentified patent and that said Letters Patent is hereby corrected as shown below:

TITLE PAGE:

[75] After "Kawasaki" insert ---Shi---; after "Yokohama" insert ---Shi---; and after "Kawasaki" insert ---Shi---.

[57] Abstract, line 3, delete "for displaying" and insert --displays-- and lines 8-9, delete "synthesizing" and insert --synthesizes the--.

Column 1, line 7, delete "1."; and line 13, delete "2.".

Column 3, line 12, delete "control" and insert --controller--; and line 13, delete "means".

Column 5, line 12, delete "Dart" and insert --part--.

Column 6, line 8, after "e.g." insert --,--; and line 33, delete "3" and insert --③--.

Column 7, line 6, after "i.e." insert --,--.

UNITED STATES PATENT AND TRADEMARK OFFICE
CERTIFICATE OF CORRECTION

PATENT NO. : 5,367,626

DATED : November 22, 1994

INVENTOR(S) : Makoto MORIOKA et al

It is certified that error appears in the above-indentified patent and that said Letters Patent is hereby corrected as shown below:

Column 10, line 43, after "part" insert --,--; and line 45, after "part" delete ",".

Signed and Sealed this

Twenty-eight Day of March, 1995

Attest:

BRUCE LEHMAN

Attesting Officer

Commissioner of Patents and Trademarks